United States Patent
Behfar et al.

(10) Patent No.: US 6,510,467 B1
(45) Date of Patent: Jan. 21, 2003

(54) METHOD FOR TRANSFERRING DATA FILES BETWEEN A USER AND AN INTERNET SERVER

(75) Inventors: Alex A. Behfar, Poughquag, NY (US); Richard L. Ehrlickman, Pomona, NY (US); Muhammed I. Hussain, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/225,594

(22) Filed: Jan. 6, 1999

Related U.S. Application Data

(63) Continuation of application No. 09/153,987, filed on Sep. 16, 1998.

(51) Int. Cl.[7] .............................................. G06F 15/173
(52) U.S. Cl. ...................................... 709/233; 709/239
(58) Field of Search ................................ 709/227–228, 709/233–234, 238–239; 379/93.01

(56) References Cited

U.S. PATENT DOCUMENTS

| | | | | |
|---|---|---|---|---|
| 5,121,391 A | | 6/1992 | Paneth et al. ............... 370/95.1 |
| 5,249,279 A | * | 9/1993 | Schmenk et al. ............... 710/5 |
| 5,251,210 A | * | 10/1993 | Mann et al. ................. 370/519 |
| 5,317,415 A | * | 5/1994 | Kinami et al. ............... 358/425 |
| 5,355,472 A | * | 10/1994 | Lewis ......................... 703/22 |
| 5,390,239 A | * | 2/1995 | Morris et al. ............... 375/222 |
| 5,598,564 A | * | 1/1997 | Barker, III .................. 717/126 |
| 5,627,858 A | | 5/1997 | Mak et al. ................... 375/225 |
| 5,724,514 A | * | 3/1998 | Arias ......................... 709/224 |
| 5,781,598 A | * | 7/1998 | Hardy et al. ................. 375/372 |
| 5,796,952 A | * | 8/1998 | Davis et al. ................. 709/224 |
| 5,805,804 A | * | 9/1998 | Laursen et al. .............. 370/397 |
| 5,809,070 A | * | 9/1998 | Krishnan et al. ............. 375/222 |
| 5,819,220 A | * | 10/1998 | Sarukkai et al. ............. 704/240 |
| 5,841,840 A | * | 11/1998 | Smith et al. ............... 379/93.01 |
| 5,903,723 A | * | 5/1999 | Beck et al. .................. 709/200 |
| 5,923,846 A | * | 7/1999 | Gage et al. .................. 709/213 |
| 5,949,762 A | * | 9/1999 | Green et al. |
| 5,974,460 A | * | 10/1999 | Maddalozzo, Jr. et al. . 709/224 |
| 5,978,013 A | * | 11/1999 | Jones et al. ................. 348/465 |
| 5,987,510 A | * | 11/1999 | Imai et al. ................... 709/219 |
| 5,991,306 A | * | 11/1999 | Burns et al. ................. 370/429 |
| 6,012,090 A | * | 1/2000 | Chung et al. ................ 709/219 |
| 6,023,473 A | * | 2/2000 | Reine et al. ................. 370/463 |
| 6,032,193 A | * | 2/2000 | Sullivan ..................... 709/239 |
| 6,032,196 A | * | 2/2000 | Monier ....................... 709/220 |
| 6,058,433 A | * | 5/2000 | Gilbert ...................... 370/463 |

(List continued on next page.)

OTHER PUBLICATIONS

Sklower et al., RFC 1990 "The PPP Multilink Protocol (MP)", Aug. 1996, pp. 1–17.*
Bohm, "Fast Circuit Switching for the Next Generation of High performance Netwroks", IEEE, 1996, pp. 298–305.1*

*Primary Examiner*—Mehmet B. Geckil
*Assistant Examiner*—Bunjob Jaroenchonwanit
(74) *Attorney, Agent, or Firm*—Jay H. Anderson; Connolly Bove Lodge & Hutz LLP

(57) ABSTRACT

A method for increasing the rate of transfer of web page data files having embedded data files between users of an Internet service and an Internet server. The method is implemented from a set of instructions read by a computer from a diskette. The executed method assigns a first communication channel of the computer to transfer a first data file between the server and the user. The data file is checked for the identity of embedded files, and the identity and address of the embedded files are stored in a table. The embedded files are thereafter transferred through the first communication channel and a second communication channel following transfer of the first data file. In the event that a data transfer of a file becomes stalled, an additional channel is assigned to simultaneously transfer the stalled file with the channel carrying the stalled file.

5 Claims, 3 Drawing Sheets

U.S. PATENT DOCUMENTS

| | | | |
|---|---|---|---|
| 6,073,167 A | * | 6/2000 | Poulton et al. .............. 709/206 |
| 6,084,874 A | * | 7/2000 | Nguyen et al. .............. 370/352 |
| 6,104,709 A | * | 8/2000 | Rinchiuso et al. ........... 370/320 |
| 6,122,514 A | * | 9/2000 | Spauer et al. ................ 455/448 |
| 6,138,072 A | * | 10/2000 | Nagai .......................... 701/207 |
| 6,144,849 A | * | 11/2000 | Nodoushani et al. ........ 370/338 |
| 6,154,738 A | * | 11/2000 | Call ............................. 705/20 |
| 6,157,705 A | * | 12/2000 | Perrone .................... 379/88.01 |
| 6,161,132 A | * | 12/2000 | Roberts et al. .............. 709/219 |
| 6,178,419 B1 | * | 1/2001 | Legh-smith et al. ............ 707/6 |
| 6,178,429 B1 | * | 1/2001 | Cherf .......................... 707/200 |
| 6,208,640 B1 | * | 3/2001 | Spell et al. .................. 370/358 |
| 6,211,874 B1 | * | 4/2001 | Himmel et al. .............. 345/781 |
| 6,252,878 B1 | * | 6/2001 | Locklear et al. ............. 370/400 |
| 6,253,247 B1 | * | 6/2001 | Bhaskar et al. .............. 370/276 |
| 6,266,201 B1 | * | 7/2001 | Dahlerud et al. .............. 360/31 |
| 6,308,221 B1 | * | 10/2001 | Perlman et al. .............. 370/238 |

* cited by examiner

METHOD FOR TRANSFERRING DATA FILES BETWEEN A USER AND AN INTERNET SERVER

RELATED APPLICATIONS

This is a continuation, patent application of U.S. patent application Ser. No. 09/153,987, filed Sep. 16, 1998.

BACKGROUND OF THE INVENTION

The present invention is directed to improving the transfer of data files between users of the Internet system and an Internet server. Specifically, a method is described for increasing the speed of downloading or uploading information between a user and an Internet server.

Internet service has become very popular among personal computer users. Pages which are formed of multiple data files are retrieved from a server which is connected to the user via the Internet and usually through a telephone service line. The user's computer communicates via the telephone line with a modem which provides for data communications over the telephone line to the user's Internet provider.

The user accesses the web pages from a location on a server (a web site) which is identified from a unique Internet address. Once the user is connected to the server which contains the web pages of an Internet site, a data transfer of the multiple data files comprising the web page takes place.

A web page of a web site often contains multiple data files, including text files, sound files, graphic files and/or even moving graphic files. As is known in Internet technology, data files may also be transferred from the user to an Internet server for loading on a web site server, or for delivery to another user of the Internet. The rate of transfer for each of these files is limited by the bandwidth restrictions of the modem and telephone lines. The limited bandwidth available with these devices produces unacceptable waiting periods for transferring the web page files from the server down to the user's computer, during a download operation, or for transferring the files in an upload operation.

Most web pages contain one or more files such as graphics files. These files require long download times because of their sheer size. Furthermore, Internet channels can stall that further increase the delays in downloading of these files.

Various schemes have appeared over the years for increasing bandwidth by combining two or more channels. One popular technique has been the use of Inverse Multiplexing such as that described by Chuniad, et al., U.S. Pat. No. 5,333,132. Briefly, this technique separates a high speed data channel on the transmit-side to two channels and introduces alignment frames. On the receive-side the alignment frames are used to reassemble the high-speed data channel. The alignment frames are used to compensate for respective delays in the two channels.

The present invention provides a solution for decreasing the delays incurred when multiple files forming a web page are to be transferred between a server and a personal computer user. Furthermore, the present invention decreases delays due to channel stalling.

SUMMARY OF THE INVENTION

It is an object of this invention to provide for an improved data transfer between a user connected to the Internet via a telephone line.

It is a specific object of this invention to avoid delays in uploading or downloading data files having embedded data files from the Internet.

These and other objects of the invention are provided by a computer executable process which transfers data files between a personal computer of an Internet user and the Internet via multiple channels. The computer executable process may be stored on a computer readable media in the form of instructions for execution by the media. The transfer of data may be from the server to the user, or as will be evident to those skilled in the art, from the user to the server in an uploading operation. The user's computer is to an Internet provider through two channels. The personal computer assembles a retrieved web page by storing the various data files which are retrieved from the web site server. Initially, a first channel is used to transfer the first data file of a web page to the user in a downloading operation. The second channel connected to the user's computer transfers a second data file which may be embedded in the first data file to the computer for storage. As soon as one of the two channels completes the file retrieval process, it is assigned to transfer another data file embedded in the first data file for retrieval and storage. When each modem completes a data file transfer, it is subsequently assigned a new embedded data file for transfer, until all embedded data files have been transferred.

The simultaneous transfer of data files occurring through two channels increases the speed of data transfer significantly, avoiding the delays which are incurred from transferring lengthy data files one at a time.

In a preferred embodiment of the invention, the two channels include two modems connected through separate telephone lines to the Internet provider. The two channels are used to transfer a stalled data file. In this scenario, when the user's computer detects that a data file transfer has halted for a predetermined amount of time or the data transfer rate has fallen below a predetermined rate, representing a stalled file transfer, a second modem of the second channel is assigned to transfer the stalled data file. As the same data file is being transferred by both modems, when one modem has successfully transferred the entire data file, the other modem is inhibited from making a further transfer of this data file.

DETAILED DESCRIPTION OF THE INVENTION

Figure 1:
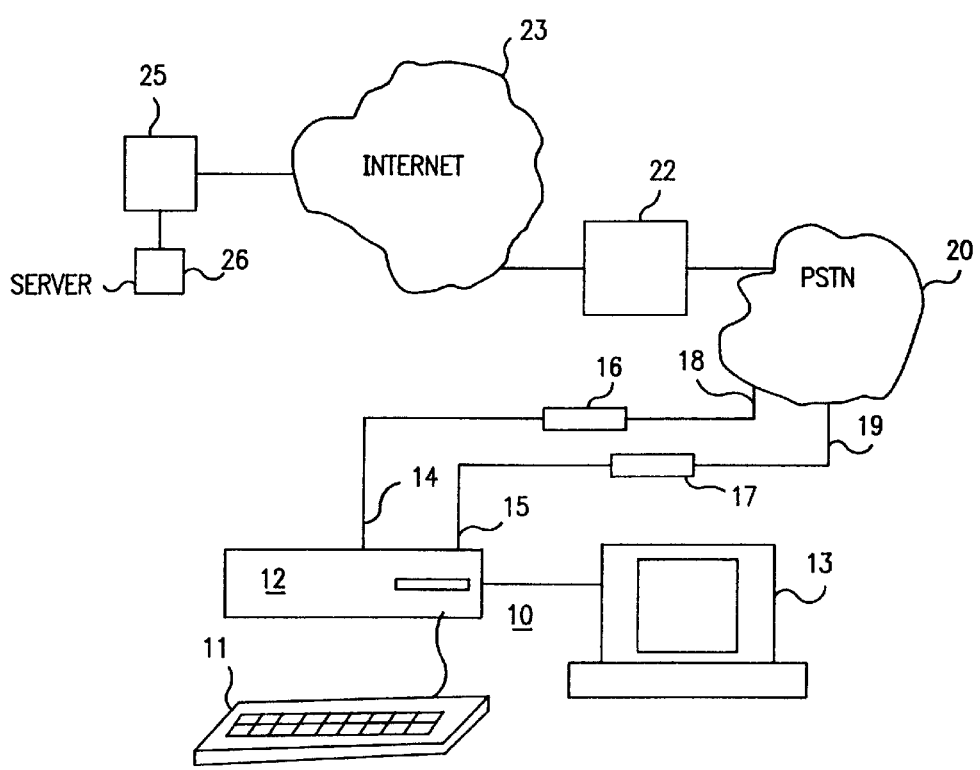
FIG. 1 illustrates a personal computer interconnected for communication with the Internet which incorporates a preferred embodiment of the invention.

Referring now to FIG. 1, there is shown a personal computer 10. The personal computer 10 includes a keyboard 11 connected to a CPU unit 12, which has a conventional computer display 13. The personal computer 10 of FIG. 1 is connected via two input/output ports 14 and 15 to the Public Switched Telephone Network (PSTN) 20. Each of the input/output ports 14, 15 is connected to an individual modem 16, 17 for generating analog signals for transmission over telephone lines 18 and 19, as well as to present digital data to computer 10 from telephone signals received from the user's Internet service provider 22.

The preferred embodiment shown in FIG. 1 includes two modems 16 and 17, connected to input/output ports 14 and 15 of the personal computer 10, to improve the data transfer from a remote server 26 connected by a host processor 25 to the Internet 23. Alternatively, the personal computer 10 may upload files to the Internet 23 utilizing each of the two output ports 14 and 15 connected through modems 16 and 17 to the telephone lines 18 and 19 thereby improving the rate of data transfer in an upload operation. Control over uploading and downloading of data files is accomplished by instructions stored on a computer readable media 9, such as a floppy diskette, which are executed by computer 10.

The computer user's Internet provider 22 is also connected to the PSTN 20. In conventional Internet technology, the personal computer 10 may transfer Internet files from any server 26 on the Internet by addressing the particular Internet file, commonly referred to as the web pages. Addresses for web pages are known and published, and the user of the personal computer 10 with standard communications protocols located within the CPU 12 may retrieve any of the Internet web pages from any server 26 in which they are stored.

The processor 25, associated with server 26 handles the exchange of files between server 26 and the computer 10. The Internet files constituting a web page may include other embedded files, defining a display graphic, a sound file, or moving graphics. An application program, known as a browser running on the personal computer 10, assembles all of the files constituting a web page, and presents to the user through display 13 the various files in a manner defined by the web page.

The transfer of a web page with its embedded data files normally occurs sequentially, with the web page file being transferred in the case of a download from server 26 to the computer 10. The data file contains references to embedded files, such as graphics and sound files, associated with the web page. In conventional Internet communications, these embedded files would be sequentially transmitted until the computer 10 received all of the required data files. The application program, or browser, assembles the files for presentation to the user.

The downloading of multiple data files through the limited bandwidth of telephone lines 18 or 19 and the PSTN 20 results in long delays being incurred between the time a request is made for the Internet files and the assembling of the files in computer 10 for viewing. These waiting periods can be excessively long and unacceptable to many users.

The implementation of FIG. 1 provides for a reduction in the delays for downloading or uploading web page files. The transmit time required to download or upload a web page consisting of embedded files is reduced. A pair of modems 16 and 17 are connected to a respective input/output port 14 and 15 of computer 10. As will be evident with respect to the description of FIGS. 2 and 3, the additional channel provided by the additional telephone line, modem and input/output port of computer 10, increases the user's total bandwidth improving the speed of downloading and uploading data files. In the case of embedded data files, the two channels are assigned to transfer respective embedded data files simultaneously, and when one has completed a file transfer it is reassigned to transfer yet another embedded data file.

If, in the process of downloading or uploading a data file, a channel becomes stalled, the other data channel may be assigned to transfer the required file. When two data channels are transferring a data file, the one which completes first terminates the transfer by the other channel, freeing up the two channels for transferring other data files.

The processing of embedded files may be in accordance with two distinct modes of operation. In the first mode of operation, the web page file is, in the case of a download operation, downloaded from the server 26 to the computer 10. Following the complete transfer, a table is created which identifies the embedded files with the name of each file, which are subsequently retrieved by the computer 10. The web page may take the form of Table 1.

TABLE 1

File A

```
<html>
<head>
<title>Speedy Internet Access
</head>
<body>
<!-- Example of a web page with
four embedded graphic files -->
<img src = "http://www.ibm.clm/         <== This is the
speedy_internet/FileB.gif>              URL for File B
<img src = "http://www.ibm.clm/         <== This is the
speedy_internet/FileC.gif>              URL for File C
<img src = "http://www.ibm.clm/         <== This is the
speedy_internet/FileD.gif>              URL for File D
<img src = "http://www.ibm.clm/         <== This is the
speedy_internet/FileE.gif>              URL for File E
</body>
</html>
```

Files B, C, D and E are embedded data files of File A which must be recovered to complete the web page.

In the alternative implementation, the table is created on the fly, that is as the web page file is downloaded via one of the channels, each time an embedded file is referenced, its identity and address are placed in the table. The second channel may be assigned to retrieve an identified embedded file before the web page file has completely downloaded.

In either embodiment, all channels are assigned an embedded file when they become free, thus multiple files are downloaded in as little as half the time of a conventional single channel Internet connection.

As will be explained with respect to the process of FIG. 2 which is executed during downloading of a file, if a download has stalled, the other channel will be assigned to simultaneously download the file. When the file is completely downloaded, downloading of this file in all the channels is halted.

Figure 2:
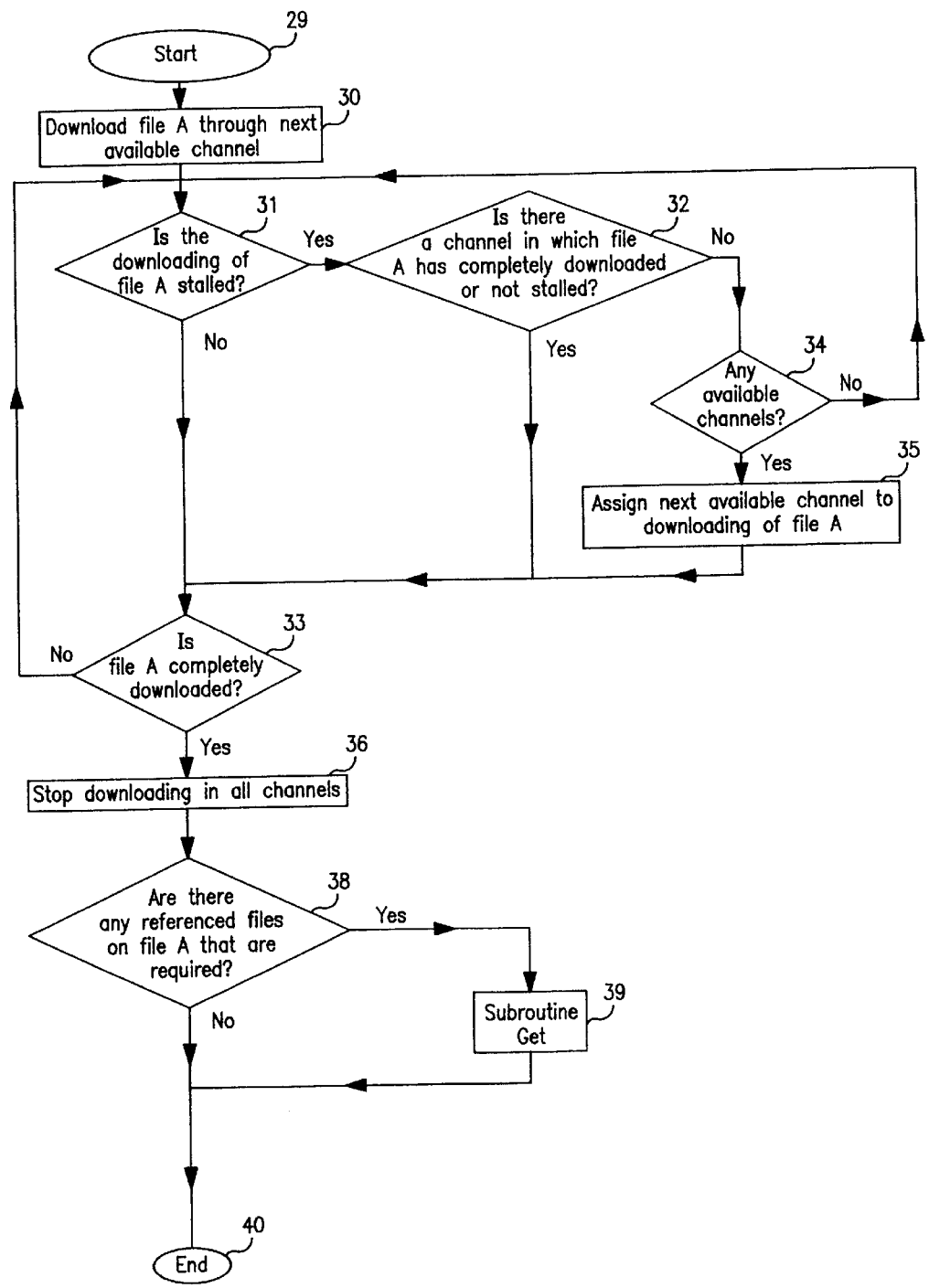
FIG. 2 is a flowchart illustrating the downloading of a web page file in accordance with a preferred embodiment of the invention.

FIG. 2 represents the process for transferring an Internet file from server 26 to a computer 10. The process may be implemented as a set of instructions stored on a computer readable media 9 which are executed by computer 10. Prior to downloading the web page file (referred to as File A in FIG. 2), a connection is established through each of ports 14 and 15 to the Internet provider 22 via two channels under control of computer instructions stored on the media 9 read by computer 10. The protocol for connecting two channels from input/output ports 14, 15 through modems 16 and 17 and telephone lines 18 and 19 begins by placing a call through each of the channels to the service provider 22. Service provider 22 then initiates two separate Internet connections over the Internet to the server 26. The modems 16 and 17 are directly connected to the input/output ports 14, 15 of a personal computer 10. An operating system, or an operating system with additional control software, capable of handling multiple modems is used on the user's personal computer 10. An example of an operating system that supports multiple modem connections (up to 256 modems) is Microsoft Windows NT Server 4.0 (see, for example, "Using Windows NT Server 4" by Roger Jennings, pp. 689–690).

Once each of the channels are connected to the server 26, one of the channels is assigned to download File A. The downloading of a file from server 26 proceeds in the conventional way. The progress of downloading File A through the available channel is monitored in step 31 to determine whether or not the downloading has stalled. If the downloading has stalled, i.e., there has been no data transfer for a given period of time or the transfer rate has fallen below a predefined rate, a second channel is assigned in step 35 to download the web page data file, File A. This results if it is determined in step 32 that File A has not completely downloaded through another channel, and if step 34 determines there is another channel available to assign for downloading File A.

The progress of downloading File A is monitored in step 33. When the file has been completely downloaded, downloading of this file is stopped in all channels in step 36. The foregoing process results in two channels downloading the same file, simultaneously, and when either channel completely downloads File A, both channels are inhibited from any further download of the file in step 36.

The web page data file, File A most likely contains embedded reference files which are required for a complete display of the web page. These files are identified in the Internet file sequence which constitutes File A, by an identity as well as an address where the embedded files are located on an Internet server. In the process of downloading File A, a table is created for the embedded file identities and their corresponding Internet addresses. A subroutine 39 will, from the contents of the table, recover the embedded data file identified in the table.

Figure 3:
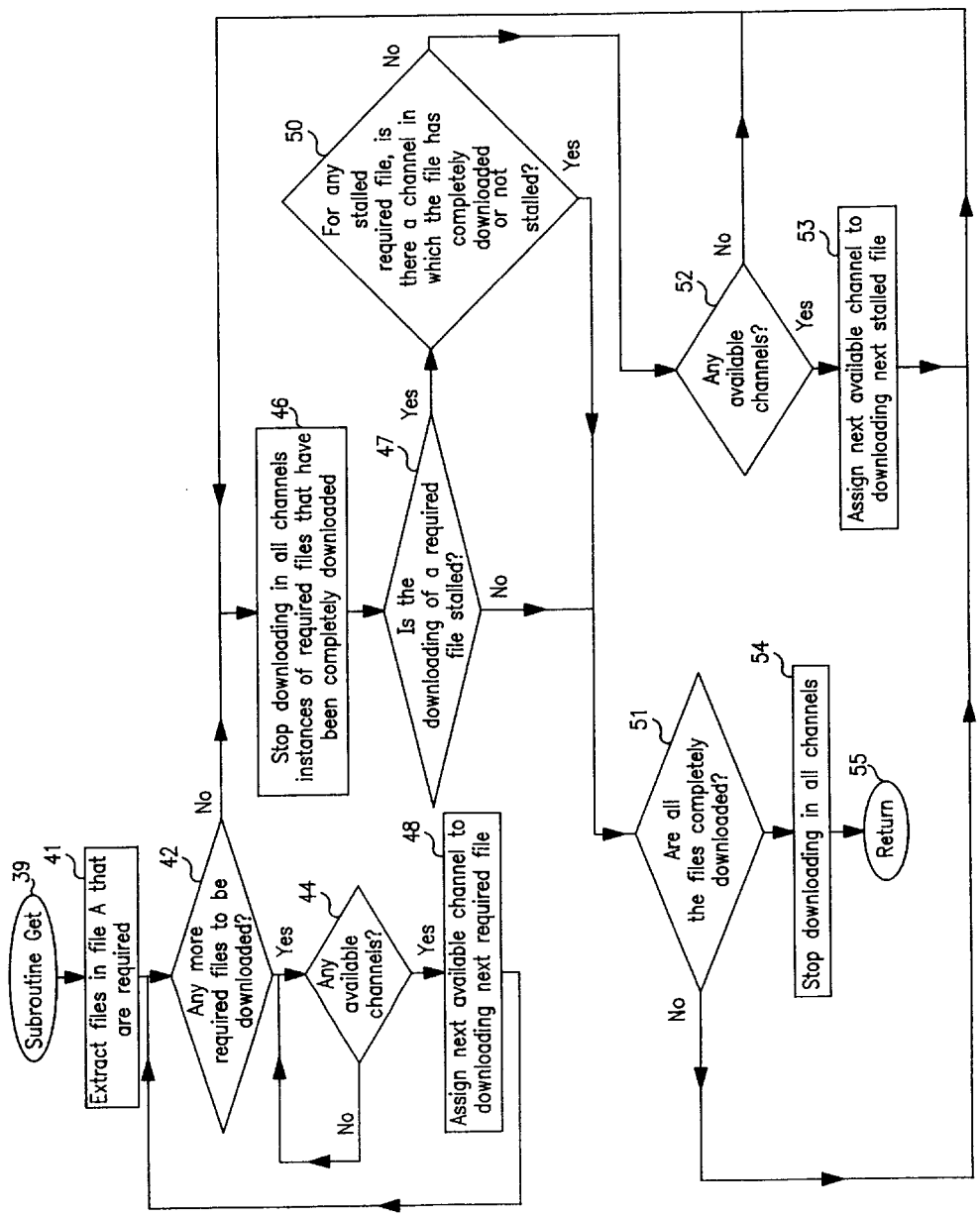
FIG. 3 is an illustration of a subroutine executed by the personal computer for downloading embedded files within the web page file downloaded in FIG. 2.

The subroutine 39 is shown more particularly in FIG. 3. It should be noted that in a first implementation of the embodiment of FIG. 2, the subroutine 39 is invoked as soon as the first table entry is made, identifying the first embedded file. This begins the process of retrieving embedded files before File A has been completely downloaded.

As an alternative embodiment, the subroutine 39 is not invoked until the table has been completely filled, following the complete downloading of File A. Once all embedded data files have been recovered, and stored in the computer 10, the process of FIG. 2 ends at step 30.

The subroutine 39 is illustrated more particularly in FIG. 3.

Referring now to FIG. 3, the subroutine is illustrated for transferring multiple Internet files two at a time over the pair of channels of FIG. 1. The complete address of the embedded files is obtained from the table in step 41. Prior to completely downloading all of the required embedded files, decision block 42 will transfer control to step 48, when there are available channels as determined in step 44, to download the remaining embedded files. In the sequence represented by decisions blocks 42, 44 and 48, as soon as a channel becomes free it is assigned for downloading an embedded file which is contained in File A.

Once the total number of required embedded files have been downloaded, the downloading in all channels is stopped in step 46. In the event that a file has stalled during downloading as determined in step 47, step 50 determines whether there is a channel in which the file has completely downloaded or not stalled. In the event that the stalled file has not been downloaded in any other channel, a channel is assigned in step 53 to download the stalled file when decision block 52 determines that there is an available channel to download the stalled file. If there is a channel in which a file has completely downloaded, or is being downloaded and has not stalled, and when all files have been downloaded, downloading in all channels may be stopped in step 54, and the subroutine returns control in step 55 back to the flowchart of FIG. 2.

Thus, there has been described with respect to one embodiment a method and apparatus for enhancing the file transfer over the Internet.

Although described for simplicity in terms of two modems, flowcharts of FIGS. 2 and 3 are applicable to two or more connections to a personal computer 10. Further, the processes of FIGS. 2 and 3 may be executed from stored instructions on a diskette 9 which are read and stored in the computer 10.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. A method for increasing the rate of transfer of a web page data file having embedded data files between a user and an Internet server comprising:

assigning a first communication channel to transfer a first data file between said Internet server and a user;

checking said first data file for the identity of said embedded data files;

storing the identity and address of said embedded data files in a table;

simultaneously transferring said embedded data files identified in said table through said first communication channel and a second communication channel which is connected between said server and said user following transfer of said first data file;

assigning said communication channels to transfer additional embedded files when said communication channels have completed transferring an embedded file; and determining when a file being transferred has stalled; and assigning an additional channel to transfer said stalled file.

2. A system for increasing the rate of recovery of files from an Internet server comprising:

first and second communication channels connected to an Internet provider which is capable of accessing said server;

a computer having first and second I/O ports connected to said first and second communication channels, said computer being programmed to execute the process of:

connecting each of said channels to said Internet provider;

initiating a request to said Internet provider to download a file of a web page to said computer over said first and second communication channels; and terminating downloading of said file when one of said communication channels completes downloading of said web page file, wherein said computer is programmed to initially assign one of said channels to download said file, and to subsequently assign the remaining channel to download said file when downloading of said file in said first channel stalls, whereby said channels simultaneously download said file.

3. The system according to claim 2 wherein said computer is programmed to initially download one of said web page files, and to identify any embedded files in said one file.

4. The system according to claim 3 wherein said computer is programmed to assign said first and second channels to download different embedded files.

5. A computer readable medium including stored therein instructions for performing the process of increasing the rate of transfer of a web page file having embedded data files between a user and an Internet server comprising:

assigning a first communication channel to transfer a first data file between said Internet server and a user;

checking said first data file for the identity of said embedded files;

storing the identity and address of said embedded data files in a table;

simultaneously transferring said embedded files identified in said table through said first communication channel and a second communication channel which is connected between said server and said user following transfer of said first file;

assigning said communication channels to transfer additional embedded files when said communication channels have completed transferring an embedded file;

determining when a file being transferred has stalled; and assigning an additional channel to transfer said stalled file.

* * * * *